(12) United States Patent
Glain et al.

(10) Patent No.: US 11,498,461 B2
(45) Date of Patent: Nov. 15, 2022

(54) PASSENGER SEAT WITH COMFORT LAYOUT

(71) Applicants: Safran Seats USA LLC, Gainesville, TX (US); Safran Seats, Plaisir (FR)

(72) Inventors: Arthur K. Glain, Boulogne Billancourt (FR); Victor Carlioz, New Port Beach, CA (US); Nick Sandham, London (GB)

(73) Assignees: Safran Seats USA LLC, Gainesville, TX (US); Safran Seats, Plaisir (FR)

( * ) Notice: Subject to any disclaimer, the term of this patent is extended or adjusted under 35 U.S.C. 154(b) by 637 days.

(21) Appl. No.: 16/486,275

(22) PCT Filed: Nov. 17, 2017

(86) PCT No.: PCT/US2017/062142
§ 371 (c)(1),
(2) Date: Aug. 15, 2019

(87) PCT Pub. No.: WO2018/151779
PCT Pub. Date: Aug. 23, 2018

(65) Prior Publication Data
US 2021/0402897 A1 Dec. 30, 2021

Related U.S. Application Data

(60) Provisional application No. 62/472,856, filed on Mar. 17, 2017, provisional application No. 62/460,298, filed on Feb. 17, 2017.

(51) Int. Cl.
*B60N 2/34* (2006.01)
*B64D 11/06* (2006.01)
(Continued)

(52) U.S. Cl.
CPC ............... *B60N 2/34* (2013.01); *B60N 2/005* (2013.01); *B60N 2/665* (2015.04); *B60N 2/914* (2018.02);
(Continued)

(58) Field of Classification Search
CPC .......... B60N 2/34; B60N 2/995; B60N 2/665; B60N 2/914; B60N 2/005; B60R 7/043;
(Continued)

(56) References Cited

U.S. PATENT DOCUMENTS

| 1,968,232 A | 7/1934 | Peter |
| 3,880,463 A | 4/1975 | Shephard |

(Continued)

FOREIGN PATENT DOCUMENTS

| CN | 101316759 A | 12/2008 |
| CN | 105054635 A | 11/2015 |

(Continued)

OTHER PUBLICATIONS

International Patent Application No. PCT/US2017/062142, Search Report and Written Opinion, dated Mar. 19, 2018.
(Continued)

*Primary Examiner* — Anthony D Barfield
(74) *Attorney, Agent, or Firm* — Kilpatrick Townsend & Stockton LLP

(57) ABSTRACT

A passenger seat (10) with a sitting area (40), a side ottoman (42), an open space (44) that may be enclosed via use of a bed extension (50), and a backrest (14). The backrest may be divided into an upper portion and a lower portion. The seat may also be provided with one or more storage areas and/or a side console.

18 Claims, 10 Drawing Sheets

(51) Int. Cl.
  *B60N 2/66* (2006.01)
  *B60N 2/90* (2018.01)
  *B60N 2/005* (2006.01)
  *B60R 7/04* (2006.01)

(52) U.S. Cl.
  CPC .............. *B60N 2/995* (2018.02); *B60R 7/043* (2013.01); *B64D 11/0601* (2014.12); *B64D 11/0606* (2014.12); *B64D 11/0627* (2014.12); *B64D 11/0641* (2014.12)

(58) Field of Classification Search
  CPC ............ B64D 11/0601; B64D 11/0606; B64D 11/0627; B64D 11/0641
  See application file for complete search history.

(56) References Cited

U.S. PATENT DOCUMENTS

| | | | |
|---|---|---|---|
| 5,628,547 | A | 5/1997 | Matsumiya |
| 5,836,647 | A | 11/1998 | Turman |
| 5,836,651 | A | 11/1998 | Szerdahelyi |
| 5,857,745 | A | 1/1999 | Matsumiya |
| 5,954,401 | A | 9/1999 | Koch |
| 5,992,798 | A | 11/1999 | Ferry |
| 6,059,364 | A | 5/2000 | Dryburgh |
| 6,170,786 | B1 | 1/2001 | Park |
| 6,173,921 | B1 | 1/2001 | Neumann et al. |
| 6,352,309 | B1 | 3/2002 | Beroth |
| 6,412,870 | B1 | 7/2002 | Higgins |
| 6,692,069 | B2 | 2/2004 | Beroth |
| 7,108,326 | B2 | 9/2006 | Schurg |
| 7,134,729 | B2 | 11/2006 | Dowty |
| 7,178,871 | B1 | 2/2007 | Round |
| 7,318,622 | B2 | 1/2008 | Re |
| 7,472,957 | B2 | 1/2009 | Ferry |
| 7,517,010 | B2 | 4/2009 | Saint-Jaimes |
| 7,523,888 | B2 | 4/2009 | Ferry |
| 7,543,888 | B2 | 6/2009 | Kuna |
| 7,547,068 | B2 | 6/2009 | Davis |
| 7,686,394 | B2 | 3/2010 | Nishikawa |
| 7,828,387 | B2 | 11/2010 | Yoshizawa |
| 7,837,259 | B2 | 11/2010 | Staab |
| 8,348,339 | B2 | 1/2013 | Onuma |
| 8,414,076 | B2 | 4/2013 | Plant |
| 8,419,123 | B2 | 4/2013 | Hankinson |
| 8,579,375 | B2 | 11/2013 | Marais |
| 8,616,643 | B2 | 12/2013 | Darbyshire |
| 8,876,202 | B2 | 11/2014 | Olliges |
| 8,894,142 | B2 | 11/2014 | Alexander |
| 8,936,214 | B2 | 1/2015 | Foucher |
| 9,004,599 | B2 | 4/2015 | Collins |
| 9,102,255 | B2 | 8/2015 | Duckert |
| 9,944,396 | B2 | 4/2018 | Udriste |
| 10,245,986 | B2 | 4/2019 | Akaike |
| 10,266,271 | B2 | 4/2019 | Udriste |
| 10,717,534 | B2 | 7/2020 | Duckert |
| 2001/0000639 | A1 | 5/2001 | Park |
| 2003/0085597 | A1 | 5/2003 | Ludeke |
| 2004/0036336 | A1 | 2/2004 | Veneruso |
| 2006/0186719 | A1 | 8/2006 | Davis |
| 2007/0040434 | A1 | 2/2007 | Plant |
| 2007/0262625 | A1 | 11/2007 | Dryburgh |
| 2009/0146006 | A1 | 6/2009 | Park et al. |
| 2014/0110981 | A1 | 4/2014 | Hasegawa |
| 2014/0210235 | A1 | 7/2014 | Ferry |
| 2015/0028634 | A1 | 1/2015 | Scherello |
| 2015/0274299 | A1 | 10/2015 | Henshaw et al. |
| 2017/0015423 | A1 | 1/2017 | Udriste et al. |
| 2020/0010199 | A1 | 1/2020 | Ferguson |

FOREIGN PATENT DOCUMENTS

| | | | |
|---|---|---|---|
| CN | 106458330 A | 2/2017 | |
| EP | 1951571 A1 | 8/2008 | |
| EP | 2785589 A1 | 10/2014 | |
| EP | 3129289 A1 | 2/2017 | |
| JP | 2000185694 A | 7/2000 | |
| WO | WO-2005056330 A1 * | 6/2005 | |
| WO | WO-2007061381 A1 * | 5/2007 | ............ B60N 2/345 |
| WO | 2011068684 | 6/2011 | |
| WO | 2014064525 | 5/2014 | |
| WO | 2015104527 | 7/2015 | |
| WO | 2015155687 | 10/2015 | |
| WO | 2018169575 A1 | 9/2018 | |

OTHER PUBLICATIONS

Europe Patent Application No. 17817364.7, Intention to Grant (Communication under to Rule 71(3) EPC), dated Nov. 16, 2021.
Europe Patent Application No. 17817364.7, Decision to Grant (Communication pursuant to Article 97(1) EPC), dated Mar. 11, 2022.
Europe Patent Application No. 17817364.7, Communication pursuant to Article 94(3) EPC, dated Mar. 11, 2021.

* cited by examiner

PASSENGER SEAT WITH COMFORT LAYOUT

CROSS REFERENCE TO RELATED APPLICATIONS

This application is related to and claims priority benefits from U.S. Provisional Application Ser. No. 62/460,298, filed on Feb. 17, 2017, entitled "Passenger Seat," and U.S. Provisional Application Ser. No. 62/472,856, filed on Mar. 17, 2017, entitled "Business Class Seat Cabin Layout," the entire contents of each of which are hereby incorporated by this reference.

FIELD OF THE INVENTION

The field of this disclosure relates to passenger seats having improved comfort layouts and comfort features. Specific embodiments find particular use on-board passenger transportation vehicles, where a balance between comfort, space, and weight are desirably optimized.

BACKGROUND

Many vehicles such as passenger aircraft, buses, trains, ships, automobiles, and the like include seats for bearing passengers en route to a destination. The seats are designed with frames for supporting cushions, pads, and other seating components. A number of factors affect suitability of such passenger seats. For example, vehicle passenger seats are subject to safety requirements established by governments or other standard-setting organizations. Passenger comfort is also an important consideration in seat design. It is also desirable to reduce the seat's weight (e.g., which may directly affect an amount of fuel and corresponding cost to bear the seat between destinations) and general costs associated with a seat (e.g., cost of production, cost of installation, or cost of maintenance) in order to reduce overall operating costs. Airlines or other passenger aircraft operators may specify that seats for a particular aircraft or particular class level be of a particular size (e.g., have a specific maximum width or other dimension or fit within a specific footprint or area).

In many instances, passenger seats may be provided with various personal electronic and entertainment options to encourage passengers to remain seated as much as possible. This can help ensure passenger safety during transport, crew mobility, and to efficient cabin service. Some passenger seats provide video and audio entertainment, including television, video games, internet access, and other in-flight entertainment ("IFE") components. Typically, these entertainment devices are mounted in the seat backs and/or arm rests of the passenger seats.

Passenger seats also may allow for recline or other relaxing positions. For example, most aircraft seats are provided with an upright position (often referred to as a taxi, take-off and landing ("TTL") position), but that allow at least some amount of recline during travel. Some seats that are designed for extended flights have bed positions that allow the seats to fully recline or otherwise be extended to a flat (or close to flat) bed-like configuration. For these versions, the seat actuator components that provide the recline can be prone to mechanical difficulties, requiring various types of maintenance or repairs during the life of the seat in use. The seat actuator components that provide recline can also be heavy, adding additional weight to the seat system. The seat actuator components that provide recline can also be expensive to manufacture. Improvements are thus desirable.

SUMMARY

Accordingly, the present inventors have designed a passenger seat having improved comfort features, while eliminating the use of many of the typically-provided seat actuator components for recline. The passenger seat disclosed herein is designed to provide a comfortable sofa-like sitting position for a passenger, while also offering a comfortable lying position. The sitting position allows the passenger to face the forward direction of the vehicle (in line with many safety regulations). The lounging or lying down position allows the passenger to move around to achieve various comfort positions. In some examples, the seat back cushion portion can be divided into two separate sections in order to offer a passenger armrest. Further features are described herein.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there may be provided a passenger seat, comprising: a seat shell defining a passenger sitting area and a backrest, wherein the passenger sitting area and the backrest do not employ a seat actuator therebetween, a side ottoman extending from one side of the sitting area, an open space positioned forward of the sitting area, the open space configured to receive a bed extension for creating a lying space bed for a seat occupant. In a specific example, the seat backrest has an upper portion and a lower portion with a space therebetween.

According to other embodiments, there may be provided a seating arrangement, comprising: a plurality of passenger seats, each passenger seat comprising a seat shell defining a passenger sitting area and a backrest, a side ottoman extending from one side of the sitting area, and an open space positioned forward of the sitting area, the open space configured to receive a bed extension for creating a lying space bed for a seat occupant, at least one passenger seat in the plurality of passenger seats comprising a forward seat, at least one passenger seat in the plurality of passenger seats comprising a rear seat, wherein the side ottoman of the rear seat extends alongside at least a portion of the seat shell of forward seat.

BRIEF DESCRIPTION OF THE DRAWINGS

FIG. 10 shows a comparison view.

DETAILED DESCRIPTION

The described embodiments provide improved comfort features and layouts for passenger seats. While the improved comfort features and layouts are described in connection with aircraft seats, they are by no means so limited. Rather, the embodiments disclosed may be used in passenger seats or other seats of any type or otherwise as desired.

Figure 1:
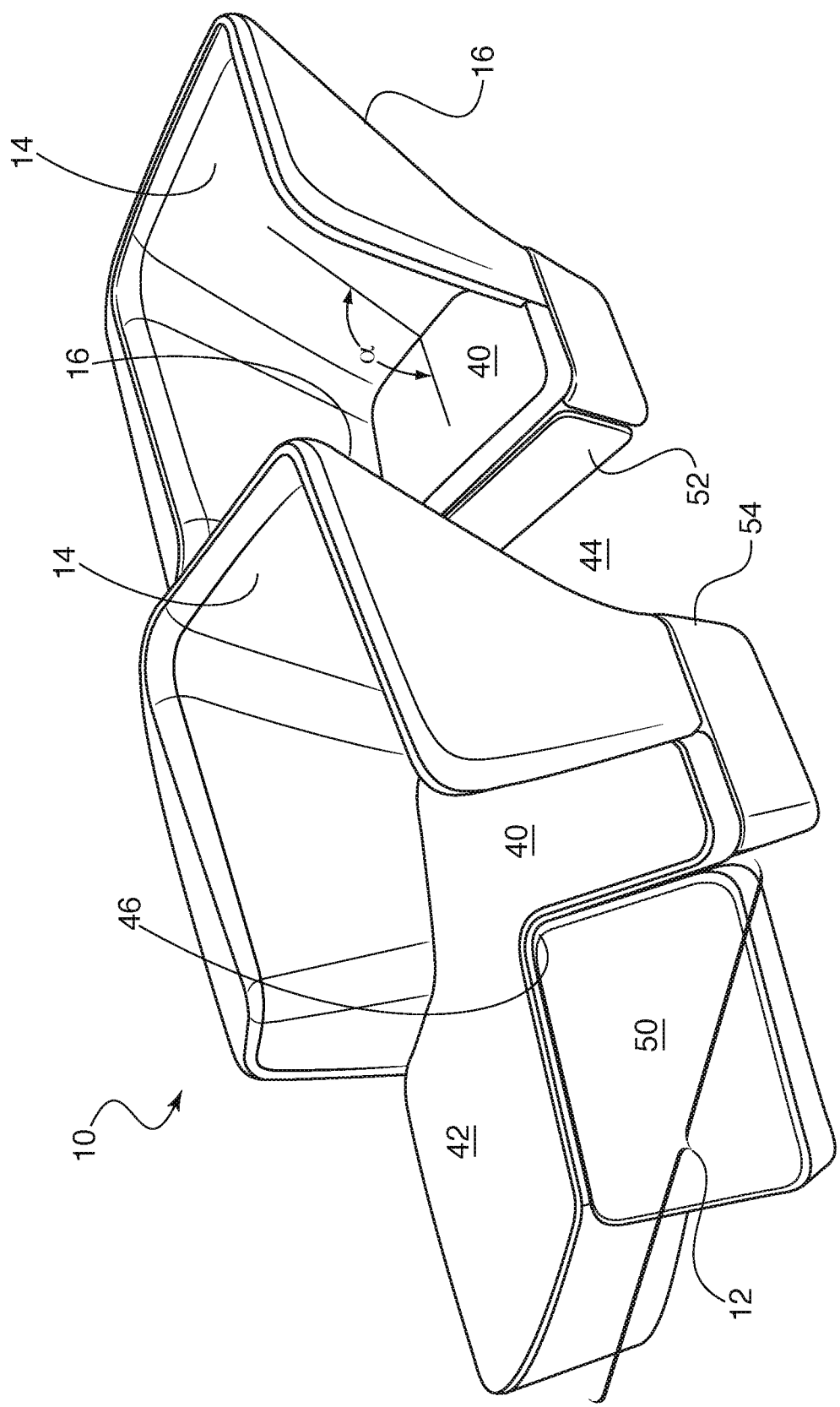
FIG. 1 is a side perspective view of passenger seat according to certain embodiments of this disclosure.
Figure 2:
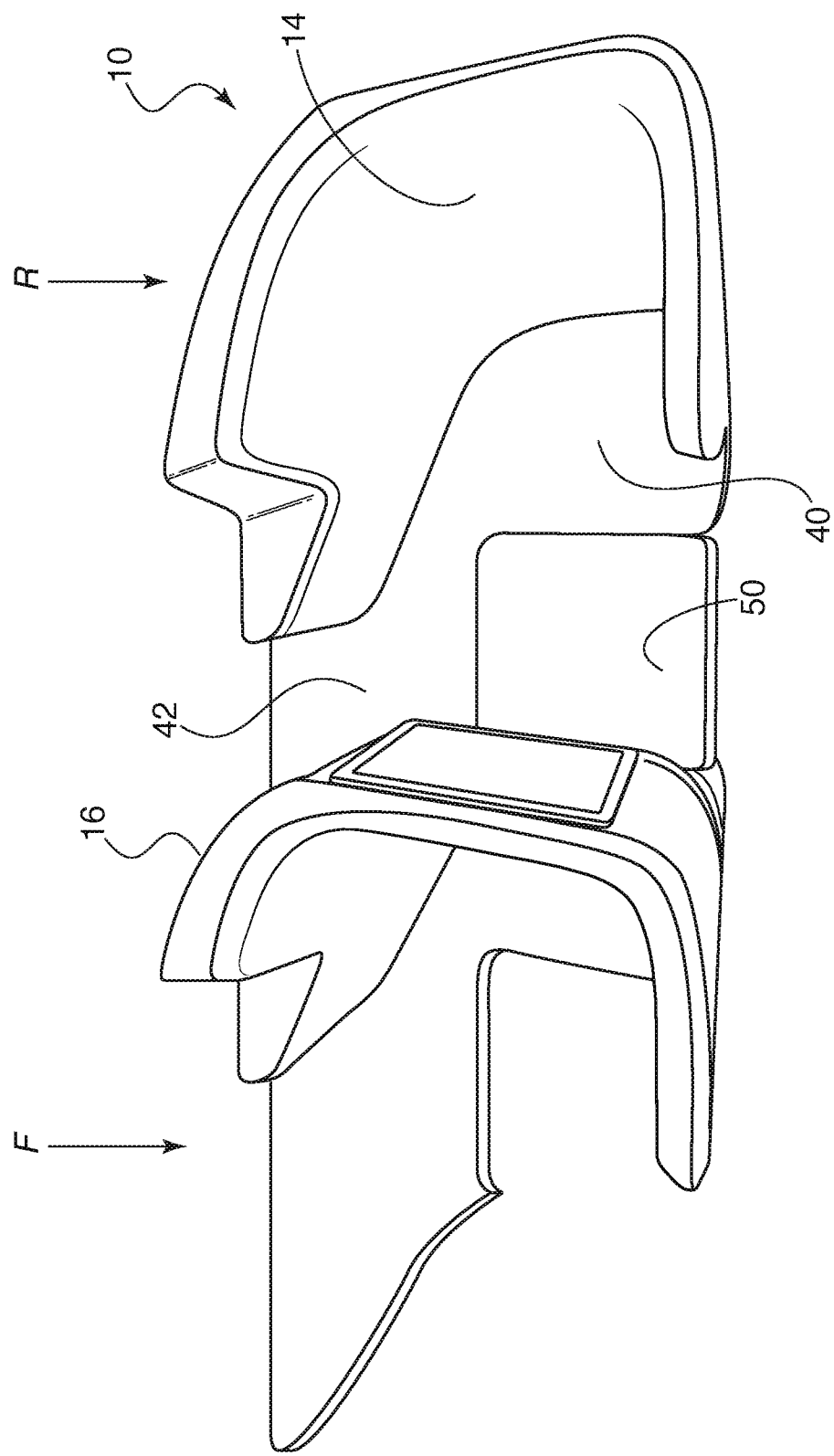
FIG. 2 is a top plan view of the passenger seat if FIG. 1.

According to certain embodiments illustrated by FIGS. 1-10, the disclosed passenger seat 10 has a seat portion 12 and a backrest portion 14, both of which are defined within or by a seat shell 16. Referring now to FIG. 1, it is shown that the angle α at which the seat portion 12 and the backrest portion 14 meet is generally greater than 90°, such that the seat occupant is allowed to have a natural recline when seated. This has been found to be a more comfortable position than providing a strictly upright seated position. One benefit of the disclosed passenger seat 10 is that there is not a seat actuator that allows movement of the backrest portion 14 with respect to the seat portion 12. The angle α between the seat portion 12 and the backrest portion 14 is static and fixed. Non-limiting exemplary angles α may be in the range of 100°-180°, which includes any angle between the seat pan and the backrest that ranges between the TTL position and the bed position. In a specific example, the range may be from about 110° to about 160°. In an even more specific example, the range may be from about 125° to about 145°. Providing a passenger seat 10 without use of the seat actuator helps reduce seat weight, seat expense, and seat complexity, without sacrificing passenger comfort due the other seat features disclosed herein. The passenger seat support (or skeleton or "bones") may be defined directly by the seat shell 16 itself.

The backrest portion 14 is generally provided as being fairly wide, as compared to other passenger seat backs. The backrest portion 14 is also provided as having a rounded or curved-like configuration that encloses the passenger for privacy, as well as comfort. In one example, the backrest portion 14 is actually defined by the seat shell 16 itself. The passenger is sitting on the seat shell 16 (albeit upon intervening cushions), rather than providing a seat unit that requires a completely separate seat shell. This can help reduce weight and complexity of the seat further.

The seat portion 12 has a sitting area 40 and a side ottoman feature 42. The side ottoman feature 42 provides a seat occupant with an area to raise his/her legs for a lounging rest position. As illustrated by the overhead view of FIG. 2, the side ottoman feature 42 may extend from one side of the sitting area 40 and alongside a seat shell 16 of a forward seat F. The side ottoman 42 may be integrated with the sitting area 40/seat pan to provide a one-piece cushioned bed/lounging experience. This design can provide a space saving benefit. It allows passengers to prop up their legs, without requiring a full leg space in front of the seat. The general concept and feel of the passenger seat 10 is to provide a couch-like experience for the passenger. The passenger can move to various positions within the seat. An open space 44 is provided immediately forward of the sitting area 40. This open space 44 allows a passenger to sit upright, with his/her legs positioned in the open space 44. In one example, the portion at which the side ottoman feature 42 projects from the sitting area 40 creates an L-shaped area 46 that helps define the open space 44. The combined sitting area 40 and the side ottoman 42 offer a cushioned lounging space. Although not shown, it is possible to provide a one piece cushion covering the entire lounging space defined by sitting area 40 and side ottoman 42. In another example, it is possible to provide multi-piece cushions that are separately removable from the passenger seat 10.

In order to convert the passenger seat 10 into a bed, which would allow the seat occupant to lie flat back, there is provided a bed extension 50. Bed extension 50 is generally illustrated as a square-shaped insert that fits into the open space 44. However, it should be understood that bed extension 50 may take any appropriate shape that is necessary to at least partially or at least fully cover the open space 44. In one example, the bed extension 50 may be a separate insert that sits upon a ledged area for positioning. In another example, the bed extension 50 may be a sliding insert that may retract into (and underneath) a forward seat F/seat shell 16 and be moved in an aft direction (e.g., in these examples, backwards) into the open space 44 once bed conversion is desired. In another example, the bed extension 50 may be a sliding insert that may retract back into (and underneath) the sitting area 40 of the passenger seat 10 and be moved forward into the open space 44 once bed conversion is desired. In another example, the bed extension 50 may be a hinged extension that extends up and out from a seat base front portion 52. In a further example, the bed extension may be a hinged extension that extend up and out from a lower portion 54 of a forward seat shell 16. Other mechanical options for deploying and stowing the bed extension 50 are possible and considered within the scope of this disclosure. Once the bed extension 50 is in place, a seat occupant may use the passenger seat 10 much like a flat bed. The seat occupant's legs may extend onto the side ottoman 42 and the sitting area 40 may be used as a headrest. An optional pillow may be provided for comfort. The pillow may be an inflatable pillow that extends up from the sitting area 40. The pillow may be a separate pillow that is provided in one or more storage areas on the passenger seat 10.

Figure 3:
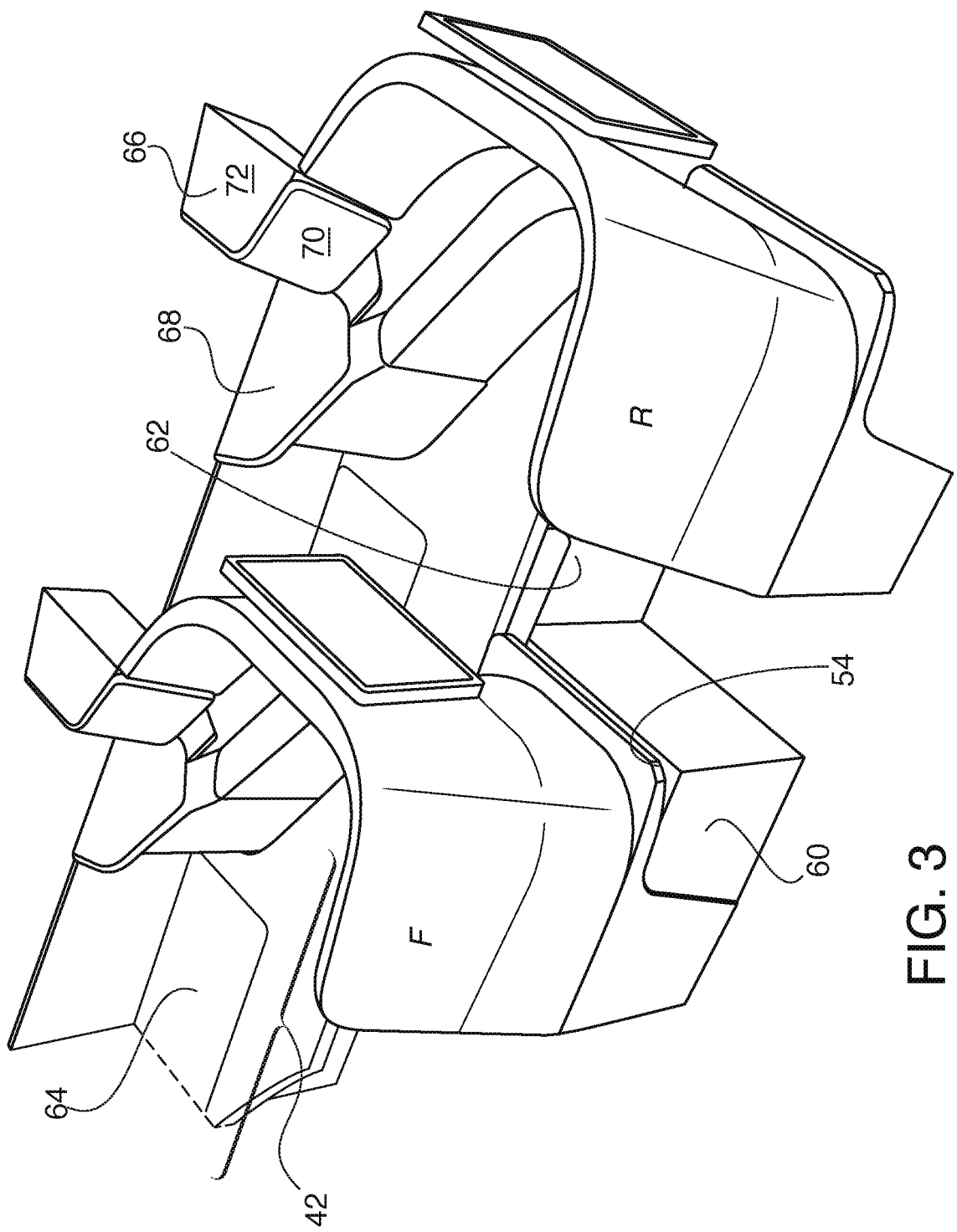
FIG. 3 is a front perspective view of passenger seat illustrating an upper storage area and a side console.
Figure 4:
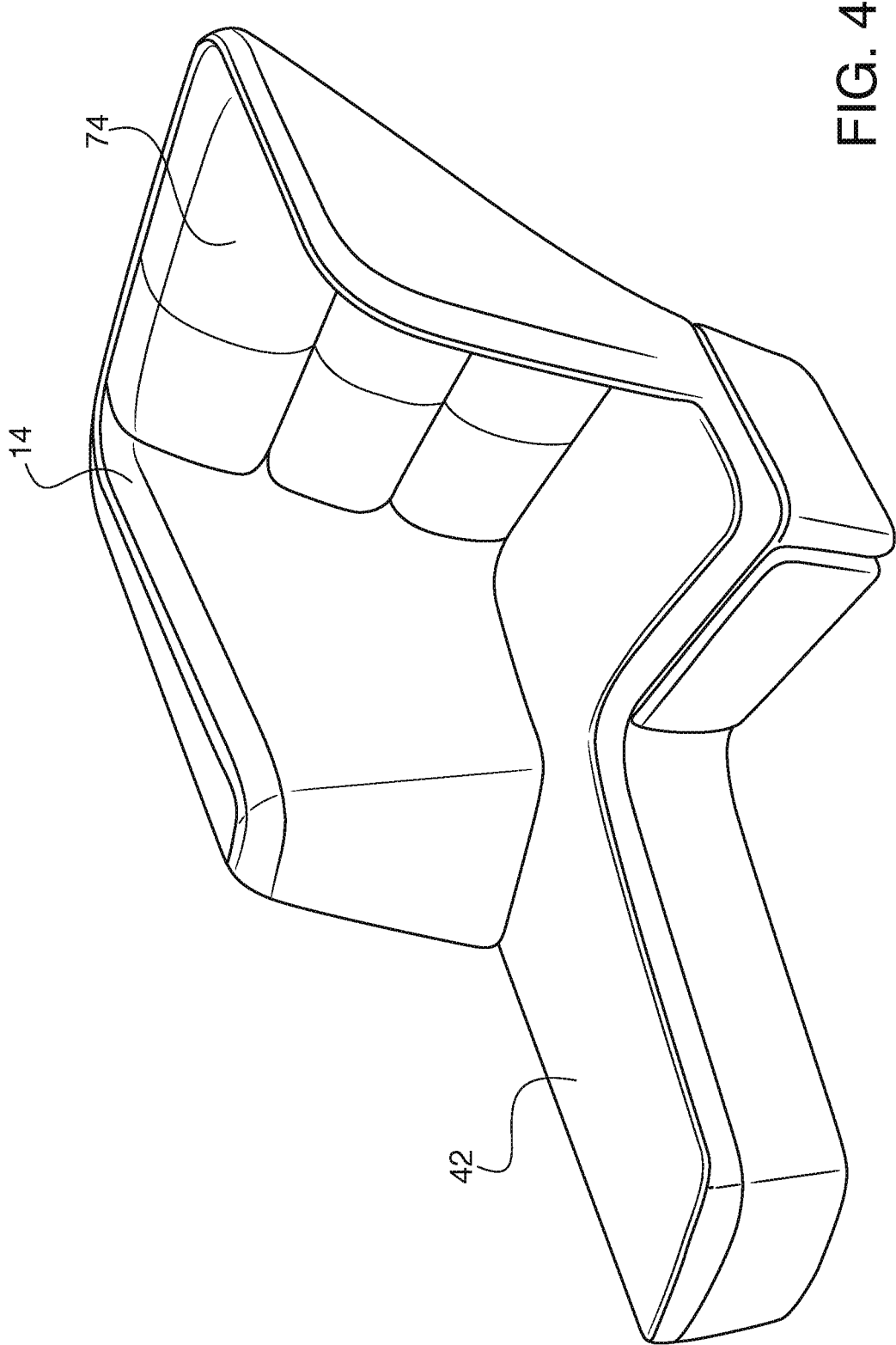
FIG. 4 is a side perspective view of passenger seat having one or more inflatable portions.

FIG. 3 illustrates one example of a storage area 60 location, which is positioned near a lower portion 54 of a forward "F" seat shell 16. Additional or alternate storage areas 62 may be positioned underneath the side ottoman 42 and/or under the sitting area 40. In one example, it is possible to provide an access port 64 to a storage area contained within the side ottoman 42. The access port(s) 64 may be a hinged lid, a removable lid, a slidable lid, or any other appropriate means for accessing a storage area contained therebelow. An upper storage area 66 may be provided adjacent to the backrest portion. This upper storage area 66 may hinge open and be used to hold smaller passenger items such as phones or other electronic devices, books, reading glasses, work papers, or any other passenger items to be stowed but easily accessible. The upper storage area 66 may be enclosed by a swing open door 70, allowing a seat occupant to access the interior of the storage area 66 during travel. The storage area 66 may also define an upper surface 72 that may be used for additional storage or stowage. It is also possible to provide a side console 68. The side console 68 may serve as a drink rest, a hand rest, or as a small resting area for passenger items. The side console 68 may be provided as having a storage feature/area as well (accessible by raising or lowering a panel defining the side console 68).

An additional optional feature of the passenger seat 10 described herein is providing a cushioned resting area. The cushioned resting area may be defined by a traditional padded seat cushion. In another example, the cushioned resting area may be provided by one or more inflatable portions 74, illustrated by FIG. 4. If provided, the one or more inflatable portions 74 may be variably inflatable in order to allow a passenger to have different levels of lumbar or neck support. For example, it is possible to change the architecture of the seat using the one or more inflatable portions 74, which function as cushioning support. A user may wish to sit more upright or may otherwise wish to change the angle $\alpha$ between the sitting area and the backrest by inflating or deflating an inflatable portions 74. The one or more inflatable portion 74 may function similar to a lumbar support in an automobile. An additional option that may be added is providing a heated or cooled seat via use of the portion 74. The passenger may be able to achieve different combinations of firmness via use of the one or more inflatable portion 74.

Figure 5:
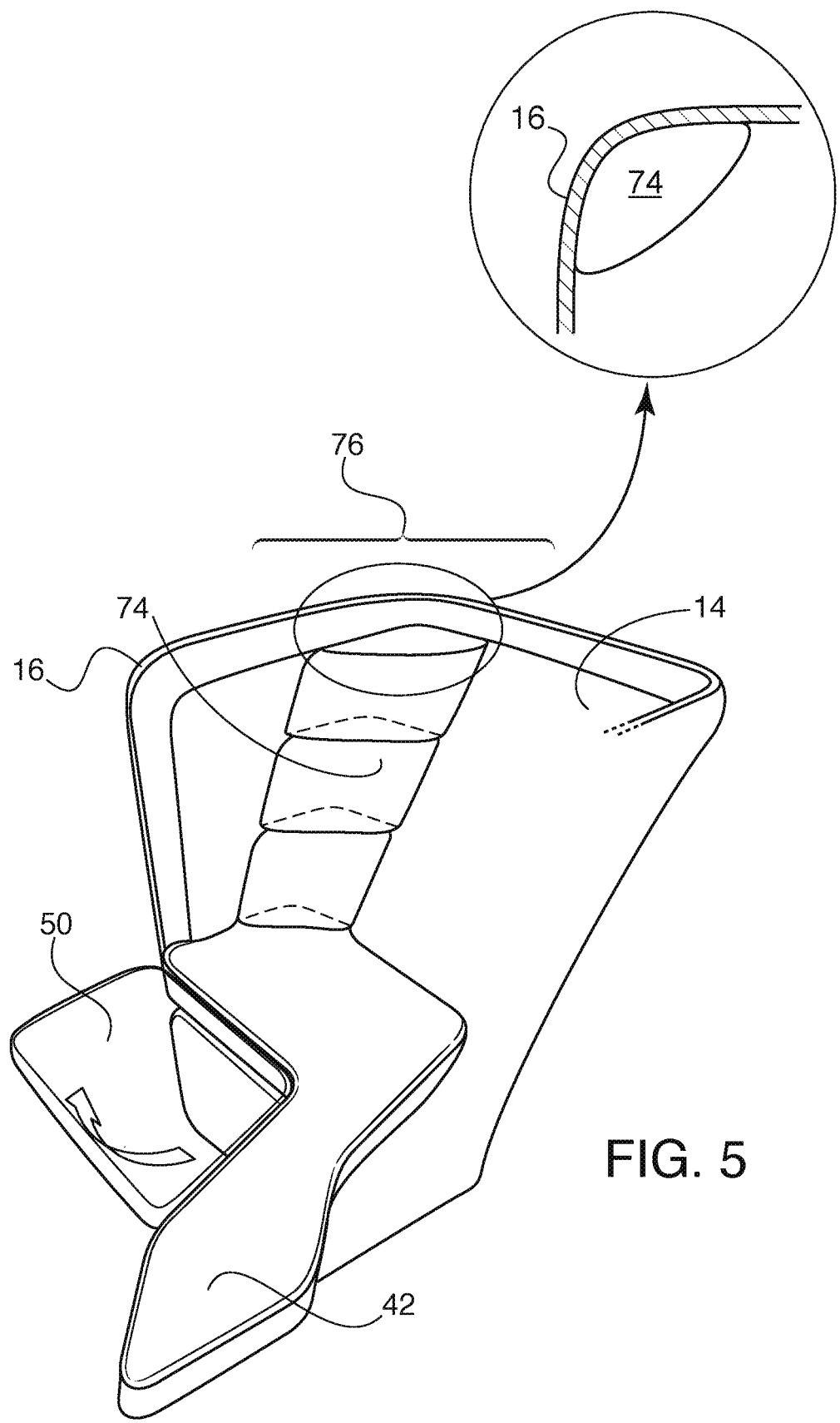
FIG. 5 is a front perspective view of passenger seat having a series of corner inflatable portions.

As shown by FIG. 5, in an additional or alternate embodiment, the one or more inflatable portions 74 may be positioned along a side corner 76 of the backrest portion 14. It is believed that this embodiment may help provide additional back support for a seat occupant (specifically, along his/her spine) who is leaning against the side corner 76 with legs raised on the side ottoman 42. It may also be possible to increase the living space provided by the passenger seat for the lying down position when the one or more inflatable portions 74 are deflated. Controls for the one or more inflatable portions 74 may be positioned on an armrest, on the side console 68, on the forward video screen, on an overhead panel, or anywhere else that may be appropriate.

Figure 6:
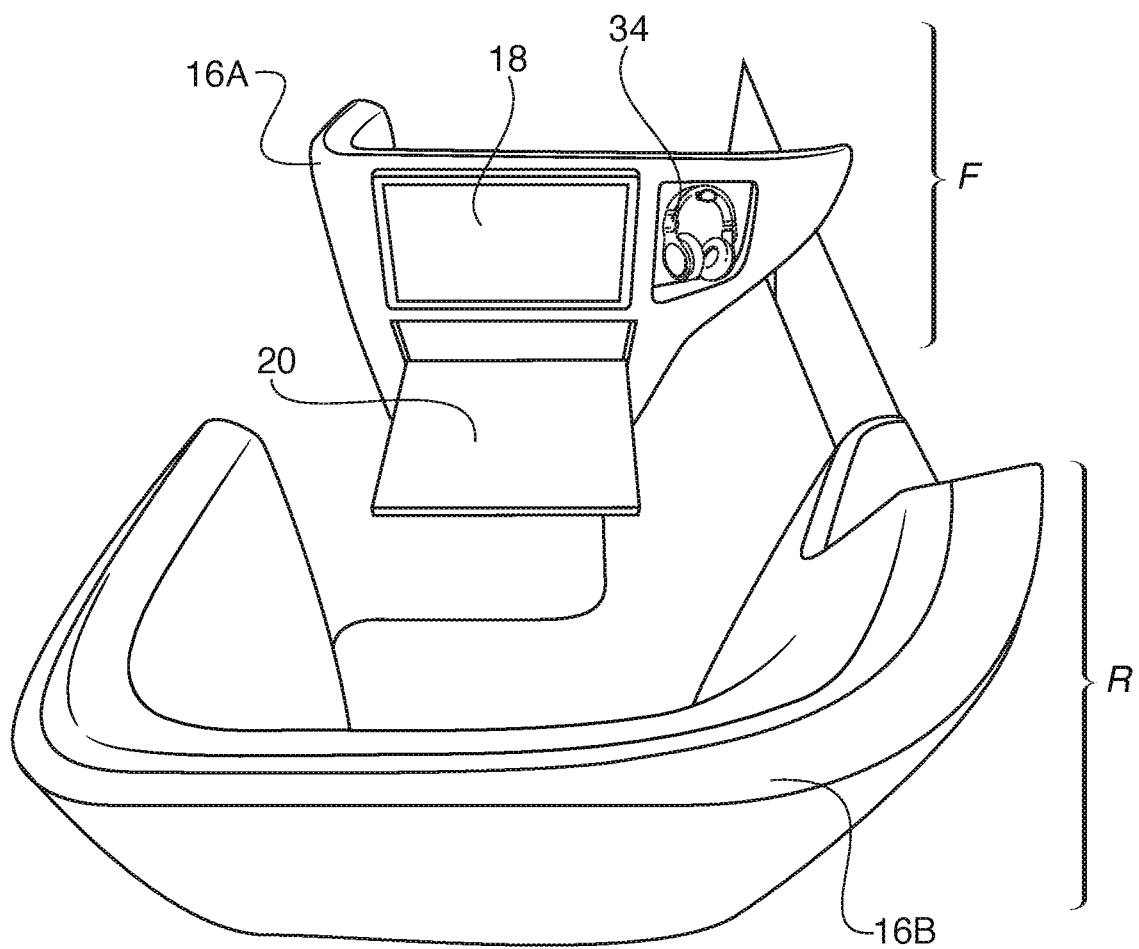
FIG. 6 is a side perspective view of passenger seat, illustrating a rear seat and a forward seat, with the rear seat supporting a video monitor any tray table that serves the rear seat.

The description will now refer to the configuration of a plurality of passenger seats 10 described herein positioned on board a vehicle, such as an aircraft. FIG. 6 shows a seat shell 16A of a forward seat F, and a seat shell 16B of a rear seat R. Seat shell 16A may be designed to support a video monitor 18 and/or a tray table 20 and/or any other comfort component that is intended to be accessible by the seat occupant of the rear seat R (the seat located directly aft of the forward seat F). The video monitor 18 and/or tray table 20 may be mounted to the forward seat shell 16A using any appropriate installment methods. They may be hingedly secured, slidably secured, or securely mounted. It is also possible for the forward seat shell 16A to contain other accessory features, such as a headphone storage area 34, a storage drawer, one or more storage ledges, or any other optional features (not all shown). The seat shell 16B of the rear seat R functions similarly for a third seat that is positioned directly aft of the rear seat R, and so forth, along a vehicle.

Figure 7:
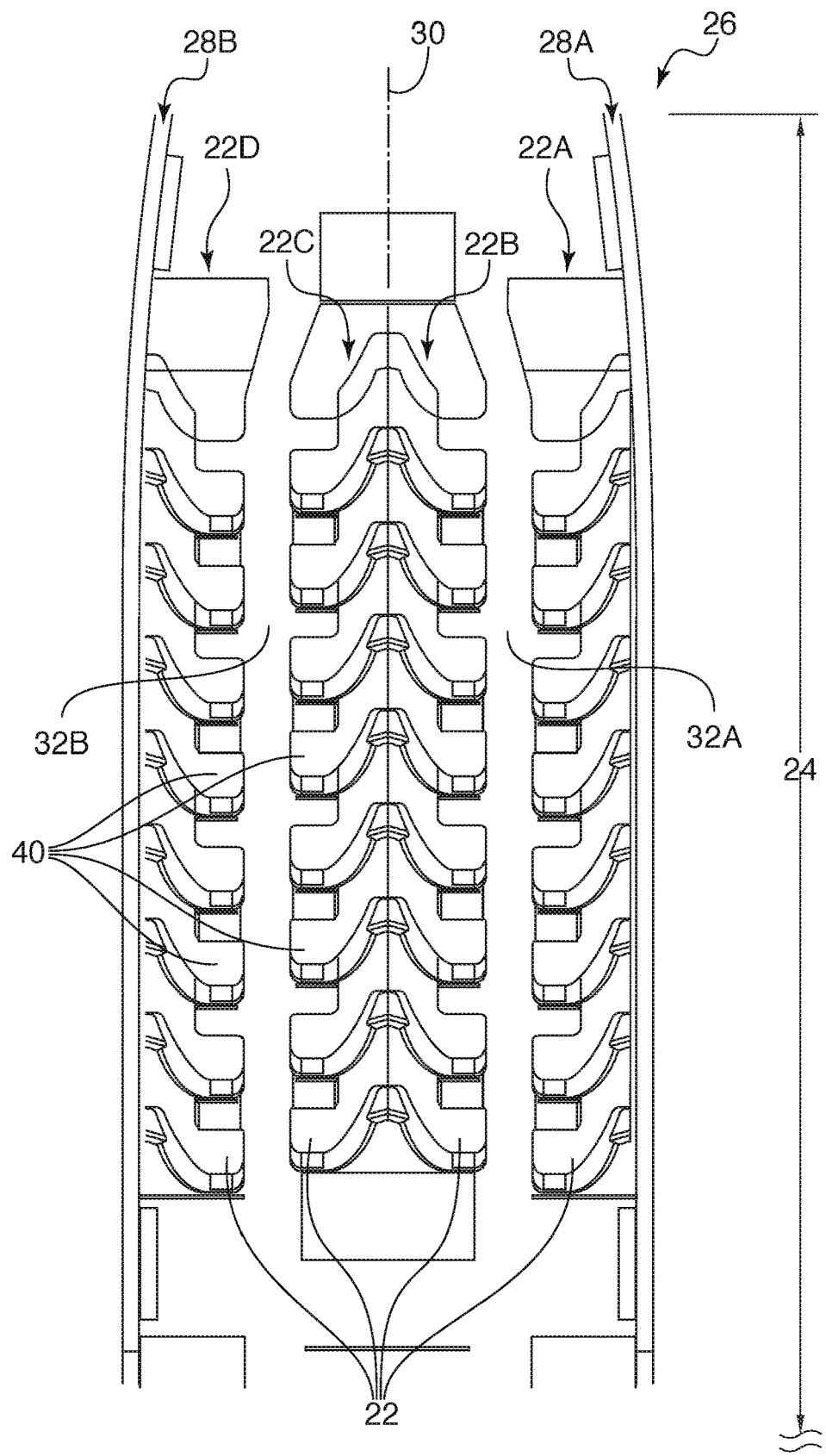
FIG. 7 is a top plan schematic of one embodiment of one possible layout of passenger accommodations (LOPA) according to certain embodiments of this disclosure.

As illustrated by FIG. 7, it should be understood that a number of passenger seats 10 enclosed by seat shells 16 may be provided along a plurality of rows 22. FIG. 7 provides only one example of a possible configuration. It should be understood that number of alternate passenger seat layouts are possible and considered within the scope of this disclosure. In this example, four rows 22 are provided along a longitudinal length 24 of the vehicle 26. A first row, 22A, is shown as positioned along a first vehicle sidewall 28A. Second and third rows 22B and 22C are shown as positioned along a central axis 30 of the vehicle 26. A first aisle 32A is created between rows 22A and 22B. A fourth row 20D, is shown as positioned along a second vehicle sidewall 28B. A second aisle 32B is created between rows 22C and 22D. The seat portions 12/sitting area 40 of each of the passenger seats 10 is generally positioned so that a seat occupant in a seated position is facing forward, in a direction along the central axis 30 of the vehicle. When and if a seat occupant chooses to lie down, his/her body would be angled with respect to the central axis 30. According to most safety regulations, this is an acceptable passenger position as long as the aircraft is not in taxi, takeoff, or landing (TTL). FIG. 7 also illustrates that the side ottomans of some of the passenger seats face in a first direction, whereas the side ottomans of other passenger seats face in a second direction. For example, side ottomans in row 22A face toward the first vehicle sidewall 28A, and side ottomans in row 22D face toward the second vehicle sidewall 28B. As illustrated, a forward/side portion of each ottoman may extend alongside a rear seat shell of the seat immediately forward. In the middle rows, 22B and 22C, the side ottomans face inwardly toward one another. A privacy wall may be present between these rows. For each passenger seat, the sitting area 40 is accessible by one of aisles for ease of entry and exit of the seats.

Figure 8:
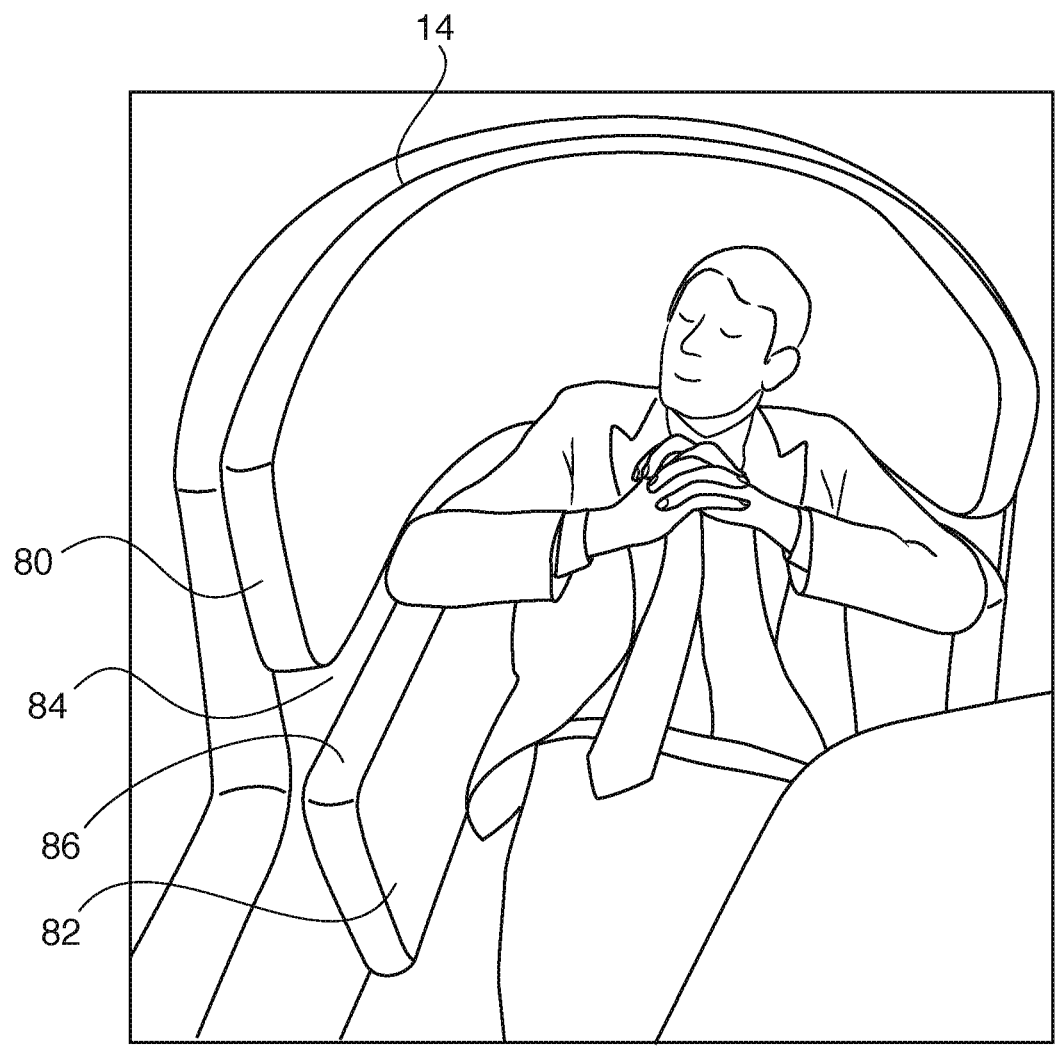
FIG. 8 is a front perspective view of passenger seat having a backrest divided into two portions.
Figure 9:
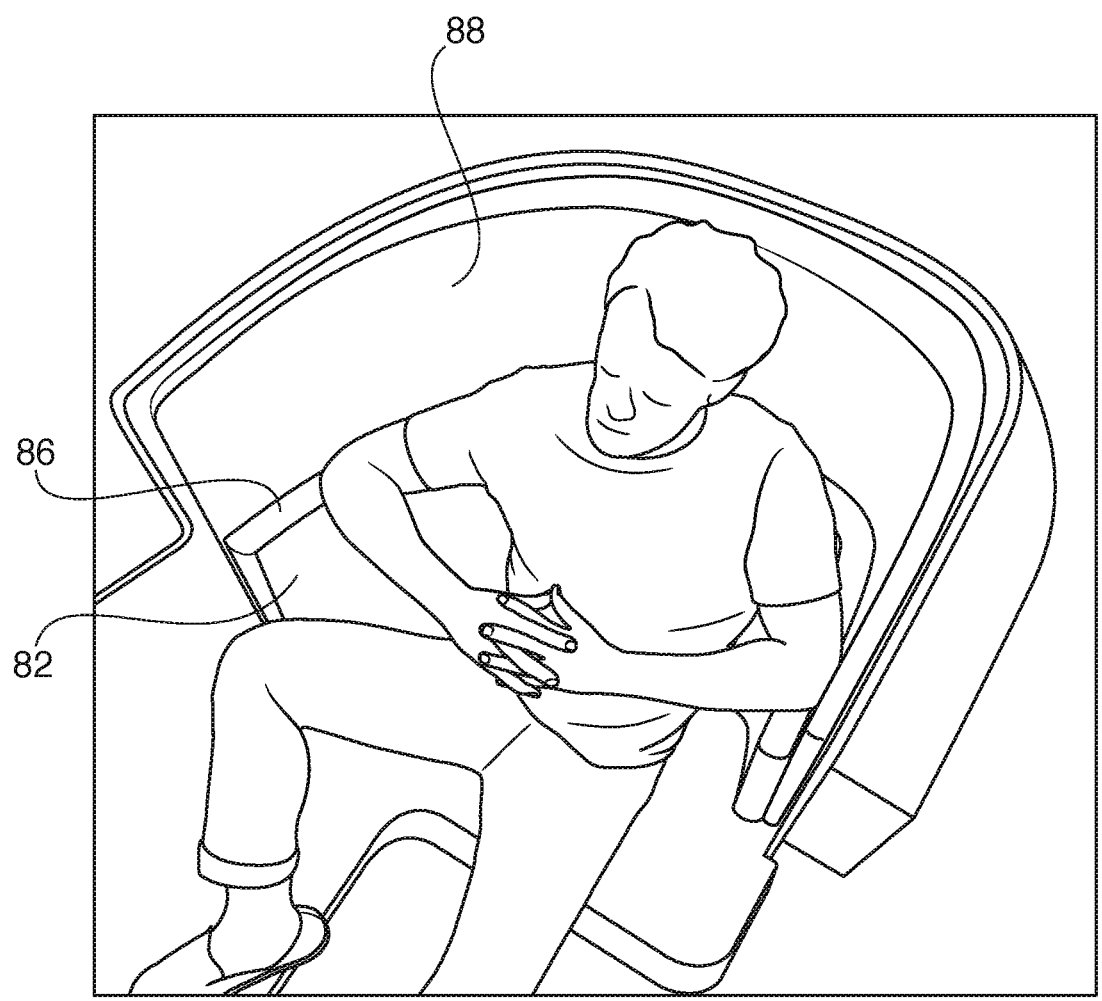
FIG. 9 is a front perspective view of passenger seat having a backrest with an elbow/armrest feature.

Although it is possible for the backrest portion 14 to be a continuous surface, FIGS. 8-9 show an alternate options for the backrest portion 14. In the version illustrated by FIG. 8, the backrest portion is provided with and upper portion 80 and a lower portion 82, defining a space 84 therebetween. In use, the upper portion 80 provides a head rest for the seat occupant. The lower portion 82 provides a lumbar support for the seat occupant. An upper surface 86 of the lower portion 82 may be used as an arm rest or an elbow rest. The space 84 formed between the upper portion 80 and the lower portion 82 provides an area for the passenger's arm and/or elbow to be received between the portions 80, 82. FIG. 9 illustrates a further embodiment, in which a space is not provided, but instead the lower portion 82 is superimposed upon one or more continuous backrest cushions 88. This version still provides an upper surface 86 that can serve as an arm and/or elbow rest, as illustrated. In an alternate embodiment, it is possible to provide a separate armrest component that tracks alongside portions of the backrest portion 14.

Figure 10B:
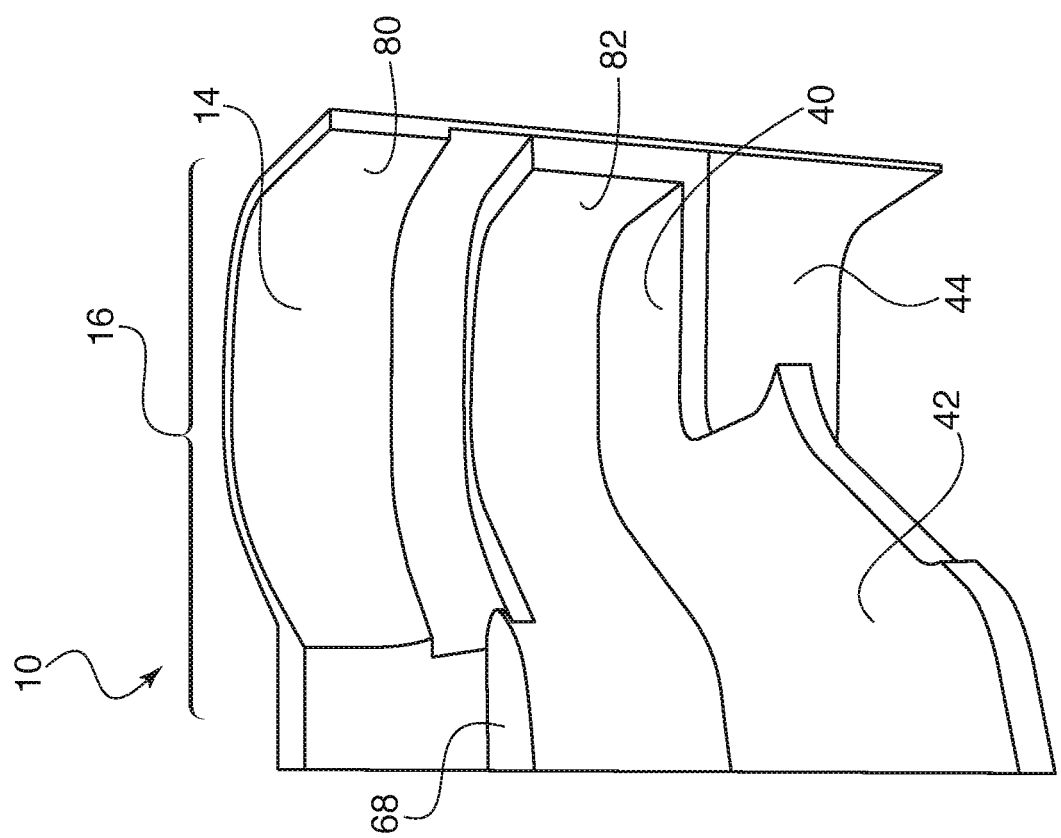
FIG. 10B is a front perspective view of a passenger seat according to certain embodiments of this disclosure.
Figure 10A:
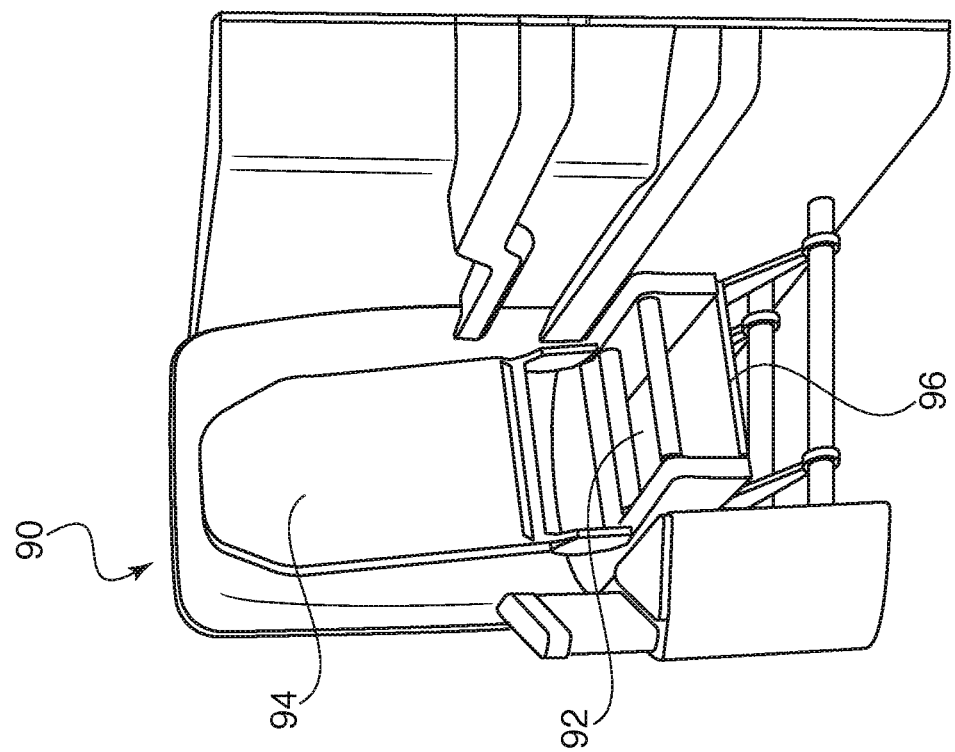
FIG. 10A is a front perspective view of prior art passenger seat.

FIG. 10 illustrates a comparison between current aircraft seat designs 90 and the described passenger seat 10. FIG. 10A shows a current aircraft seat design 90, generally including a plurality of seat actuators for seat recline and/or for raising and lowering of a leg rest. The seat 90 provide a three-piece design, with a seat pan 92, a separate backrest 94, and a separate leg rest 96, all of which cooperate with respect to one another via actuators. When the seat 90 is moved to a flat bed position, there is typically not a seamless bed area provided due to the connection areas between the three components not being perfectly aligned in use.

By contrast, FIG. 10B shows one embodiment of a passenger seat 10 described herein. As shown, the seat 10 may be provided without any actuators required. The seat 10 provides a sitting area 40, a side ottoman 42, an open space 44 that may be enclosed via use of a bed extension 50, and a backrest 14. The back rest 14 may be divided into an upper portion 80 and a lower portion 82. The seat 10 is also shown as having a side console 68. As described above, other options may be incorporated into the passenger seat 10 that is shown. In one example, it is possible for the support portion of the backrest 14 (the back area) to be defined by the seat shell 16.

The passenger seat 10 may be formed of materials including but not limited to aluminum, stainless steel, carbon fiber, plastics or other polymers, injection molded or vacuum formed plastics, polycarbonate, polypropylene, honeycomb sandwich composite panels, other similar materials, or any other metallic or composite materials, or combinations thereof. The overlay cushions of the passenger seat may be any type of cloth, textile, leather, faux leather, plastic or rubber, polyvinyl fluoride, other vinyls, suede, any other appropriate material, or combinations thereof. In a specific example, interior support panels of the seat shell may be honeycomb sandwich composite panels, manufactured of Nomex.® The lower structure may be carbon fiber. Mechanisms on the passenger seat may be aluminum and/or stainless steel. Shrouds and stowage features may be injection molded and/or vacuum formed plastics.

In the following, further examples are described to facilitate the understanding of the disclosure of this invention:

Example A

In one example, there is provided a passenger seat, comprising:

a seat shell defining a passenger sitting area and a backrest, wherein the passenger sitting area and the backrest do not employ a seat actuator therebetween, a side ottoman extending from one side of the sitting area, an open space positioned forward of the sitting area, the open space configured to receive a bed extension for creating a lying space bed for a seat occupant.

Example B

The seat of any of the preceding or subsequent examples, wherein the backrest comprises an upper portion and a lower portion with a space therebetween.

Example C

The seat of any of the preceding or subsequent examples, wherein the space therebetween is designed to function as an arm or elbow rest.

Example D

The seat of any of the preceding or subsequent examples, wherein the sitting area and the backrest are provided with a static angle with respect to one another.

Example E

The seat of any of the preceding or subsequent examples, further comprising one or more inflatable portions on the backrest.

Example F

The seat of any of the preceding or subsequent examples, wherein the one or more inflatable portions are provided on a side corner of the backrest.

Example G

The seat of any of the preceding or subsequent examples, wherein the backrest is wide and curved as compared to a traditional aircraft seat.

Example H

The seat of any of the preceding or subsequent examples, wherein the side ottoman provides a sofa-like lounging position for a seat occupant.

Example I

The seat of any of the preceding or subsequent examples, wherein the side ottoman is integrated with the sitting area.

Example J

The seat of any of the preceding or subsequent examples, wherein the side ottoman extends alongside a seat shell of another passenger seat positioned forward of the passenger seat.

Example K

The seat of any of the preceding or subsequent examples, further comprising one or more storage areas associated with the passenger seat.

Example L

The seat of any of the preceding or subsequent examples, wherein the storage area comprises a lower storage area or an upper storage area or both.

Example M

The seat of any of the preceding or subsequent examples, wherein the bed extension extends or retracts or hinges from a forward passenger seat.

Example N

The seat of any of the preceding or subsequent examples, wherein the bed extension extends or retracts or hinges from the passenger seat.

Example O

The seat of any of the preceding or subsequent examples, wherein the passenger seat is positioned with a plurality of additional passenger seats to create rows in a vehicle, wherein some of the passenger seats in the plurality of passenger seats have the side ottoman facing a first direction and wherein other of the passenger seats in the plurality of passenger seats have the side ottoman facing in a second direction.

Example P

In other examples, there is provided a seating arrangement, comprising: a plurality of passenger seats, each passenger seat comprising a seat shell defining a passenger sitting area and a backrest, a side ottoman extending from one side of the sitting area, and an open space positioned forward of the sitting area, the open space configured to receive a bed extension for creating a lying space bed for a seat occupant, at least one passenger seat in the plurality of passenger seats comprising a forward seat, at least one passenger seat in the plurality of passenger seats comprising a rear seat, wherein the side ottoman of the rear seat extends alongside at least a portion of the seat shell of forward seat.

Example Q

The seat or sitting arrangement of any of the preceding or subsequent examples, wherein a first row of passenger seats is aligned along a first vehicle wall, and wherein a second row of passenger seats is aligned along a second vehicle wall.

Example R

The seat or sitting arrangement of any of the preceding or subsequent examples, further comprising third and fourth rows of passenger seats, wherein the sitting portions of the passenger seats in the third and fourth rows are aligned along a vehicle central axis, and wherein the side ottomans of the passenger seats in the third and fourth rows extend toward one another along the vehicle central axis.

Example S

The seat or sitting arrangement of any of the preceding or subsequent examples, wherein at least one of the passenger seats comprises a backrest with an upper portion and a lower portion defining a space therebetween, wherein the space therebetween is designed to function as an arm or elbow rest.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat, comprising:
   a seat shell defining a passenger sitting area and a backrest, wherein the sitting area and the backrest are provided with a static angle with respect to one another and do not employ a seat actuator,
   a side ottoman integrated with and extending from one side of the sitting area to provide a one-piece bed/sofa-like lounging experience,
   an open space positioned forward of the sitting area, the open space providing space for a seat occupant's legs in the sitting position and configured to receive a bed extension for creating a lying space bed.

2. The passenger seat of claim 1, wherein the backrest comprises an upper portion and a lower portion with a space therebetween.

3. The passenger seat of claim 2, wherein the space therebetween is designed to function as an arm or elbow rest.

4. The passenger seat of claim 1, further comprising one or more inflatable portions on the backrest.

5. The passenger seat of claim 4, wherein the one or more inflatable portions are provided on a side corner of the backrest.

6. The passenger seat of claim 1, wherein the backrest is wide and curved as compared to a traditional aircraft seat.

7. The passenger seat of claim 1, wherein the side ottoman extends alongside a seat shell of another passenger seat positioned forward of the passenger seat.

8. The passenger seat of claim 1, further comprising one or more storage areas associated with the passenger seat.

9. The passenger seat of claim 8, wherein the storage area comprises a lower storage area.

10. The passenger seat of claim 8, wherein the storage area comprises an upper storage area.

11. The passenger seat of claim 1, wherein the bed extension extends or retracts or hinges from a forward passenger seat.

12. The passenger seat of claim 1, wherein the bed extension extends or retracts or hinges from the passenger seat.

13. The passenger seat of claim 1, wherein the passenger seat is positioned with a plurality of additional passenger seats to create rows in a vehicle, wherein some of the passenger seats in the plurality of passenger seats have the side ottoman facing a first direction and wherein other of the passenger seats in the plurality of passenger seats have the side ottoman facing in a second direction.

14. A seating arrangement, comprising:
   a plurality of passenger seats, each passenger seat comprising a seat shell defining a passenger sitting area and a backrest, a side ottoman integrally extending from one side of the sitting area to create an L-shaped area that defines, an open space positioned forward of the sitting area, the open space configured to receive a bed extension for creating a lying space bed for a seat occupant,
   at least one passenger seat in the plurality of passenger seats comprising a forward seat, at least one passenger seat in the plurality of passenger seats comprising a rear seat, wherein the side ottoman of the rear seat extends alongside at least a portion of the seat shell of forward seat.

15. The sitting arrangement of claim 14, wherein a first row of passenger seats is aligned along a first vehicle wall, and wherein a second row of passenger seats is aligned along a second vehicle wall.

16. The sitting arrangement of claim 15, further comprising third and fourth rows of passenger seats, wherein the sitting portions of the passenger seats in the third and fourth rows are aligned along a vehicle central axis, and wherein the side ottomans of the passenger seats in the third and fourth rows extend toward one another along the vehicle central axis.

17. The seating arrangement of claim 14, wherein at least one of the passenger seats comprises a backrest with an upper portion and a lower portion defining a space therebetween, wherein the space therebetween is designed to function as an arm or elbow rest.

18. The seating arrangement of claim 14, wherein the sitting area and the backrest of each passenger seat are provided with a static angle with respect to one another.

* * * * *